(12) United States Patent
Dalla Casa et al.

(10) Patent No.: US 11,609,083 B2
(45) Date of Patent: Mar. 21, 2023

(54) APPARATUS AND METHOD FOR CONTACTLESS CHECKING OF THE DIMENSIONS AND/OR SHAPE OF A COMPLEX-SHAPED BODY

(71) Applicant: Marposs Societa' Per Azioni, Bentivoglio (IT)

(72) Inventors: Maurizio Dalla Casa, Sarnico (IT); Pier Paolo Conti, Asti (IT)

(73) Assignee: Marposs Societa' Per Azioni, Bentivoglio (IT)

( * ) Notice: Subject to any disclaimer, the term of this patent is extended or adjusted under 35 U.S.C. 154(b) by 275 days.

(21) Appl. No.: 17/258,907

(22) PCT Filed: Jul. 8, 2019

(86) PCT No.: PCT/EP2019/068290
§ 371 (c)(1),
(2) Date: Jan. 8, 2021

(87) PCT Pub. No.: WO2020/011726
PCT Pub. Date: Jan. 16, 2020

(65) Prior Publication Data
US 2021/0293528 A1 Sep. 23, 2021

(30) Foreign Application Priority Data

Jul. 10, 2018 (IT) .......................... 102018000007050
Jul. 10, 2018 (IT) .......................... 102018000007052

(51) Int. Cl.
*G01B 11/03* (2006.01)
*G01B 11/02* (2006.01)
(Continued)

(52) U.S. Cl.
CPC ............. *G01B 11/03* (2013.01); *B25J 19/023* (2013.01); *G01B 11/026* (2013.01); *G01B 21/042* (2013.01)

(58) Field of Classification Search
CPC .... G01B 11/03; G01B 11/026; G01B 21/042; G01B 21/04; B25J 19/023
(Continued)

(56) References Cited

U.S. PATENT DOCUMENTS 5,177,563 A * 1/1993 Everett .................. B25J 19/021
356/621
6,615,112 B1 * 9/2003 Roos .................. G05B 19/4015
700/262

(Continued)

FOREIGN PATENT DOCUMENTS

EP      1 593 930 A1    11/2005

*Primary Examiner* — Isiaka O Akanbi
(74) *Attorney, Agent, or Firm* — Blank Rome LLP

(57) ABSTRACT

Apparatus (1) for checking the dimensions and/or shape of a complex-shaped body (3), comprising a checking support (5) on which the body to be checked is positioned, a robotic system (8) with an optical assembly (17) and a memory unit (19) for storing reference data relating to a reference shape of the body. A processing and control unit (18) controls movements of the optical assembly so as to obtain dimensional values relating to the body at predetermined measuring points, these dimensional values then being compared with the reference data stored in the memory unit. The apparatus further comprises reference elements (35) defined in the checking support in predetermined positions and a distance sensor (17) for acquiring actual positions of said reference elements. Local compensation parameters for correcting positioning errors of the robotic system are calculated for each of the reference elements on the basis of the predetermined positions and the actual positions acquired. A method for checking the dimensions and/or shape of a (Continued)

complex-shaped body by using the above described apparatus includes a calibration phase of the robotic system to calculate the local compensation parameters, a phase for collecting the reference data related to the predetermined measuring points and a dimensional checking phase of the body. The reference data collecting phase and the dimensional checking phase take into consideration the local compensation parameters.

26 Claims, 3 Drawing Sheets

(51) Int. Cl.
*B25J 19/02* (2006.01)
*G01B 21/04* (2006.01)

(58) Field of Classification Search
USPC .......................................................... 356/601
See application file for complete search history.

(56) References Cited

U.S. PATENT DOCUMENTS

| | | | |
|---|---|---|---|
| 7,324,217 B2* | 1/2008 | Herrmann | G01B 11/25 356/601 |
| 2005/0248774 A1* | 11/2005 | Herrmann | G01B 21/042 356/601 |
| 2006/0162175 A1* | 7/2006 | Stamenkovic | G01S 5/14 33/503 |
| 2007/0239315 A1* | 10/2007 | Sato | B25J 9/1612 700/245 |
| 2009/0103107 A1* | 4/2009 | Nygaard | G01B 11/2425 356/602 |
| 2009/0281649 A1* | 11/2009 | Sedlmayr | G01B 21/04 700/98 |
| 2013/0050410 A1 | 2/2013 | Steinbichler et al. | |
| 2013/0271573 A1 | 10/2013 | Steinbichler et al. | |
| 2016/0129594 A1* | 5/2016 | Telling | B25J 9/161 700/255 |
| 2016/0313114 A1* | 10/2016 | Tohme | H04N 13/257 |
| 2016/0327383 A1* | 11/2016 | Becker | G01B 11/005 |
| 2017/0276472 A1* | 9/2017 | Becker | G01B 11/25 |
| 2018/0059029 A1 | 3/2018 | Yeum | |

* cited by examiner

APPARATUS AND METHOD FOR CONTACTLESS CHECKING OF THE DIMENSIONS AND/OR SHAPE OF A COMPLEX-SHAPED BODY

TECHNICAL FIELD

The present invention relates to an apparatus and an associated method for checking the dimensions and/or shape of a complex-shaped body, for example consisting of a set of different geometric shapes, or at least a portion of such a body, which may have to be coupled with third objects that require strict tolerances. It is also possible to check one or more transparent portions of the body.

The present invention may be used for checking vehicle components such as parts of the bodywork, lights (i.e. headlights, taillights), or dashboards, as well as in various sectors, such as the 3C industry, for checking, for example, cases or displays of mobile devices such as tablets or mobile phones, or in general in any case in which it is necessary for a complex-shaped body to have very accurate dimensions and/or shape to allow precise coupling with third objects or components.

As mentioned above, the present invention may be used advantageously, but not exclusively, for checking the dimensions of vehicle lighting systems, and the following description will expressly refer to such a case without, however, being confined thereto and loosing generality.

Motor vehicle lighting systems comprise lighting bodies, each of which comprises several lighting devices and an outer lens shaped in such a way as to follow the profile of the bodywork. With the increasingly sophisticated design of motor vehicles, the bodywork and lighting bodies have ever more elaborate shapes, requiring precise mounting and assembly of the lighting body on the bodywork and compliance with strict tolerances in terms of dimensions and shape.

BACKGROUND ART

It is known to check one or more lighting bodies to verify the dimensions and shape thereof, before they are mounted, using an apparatus that comprises a support having securing means for positioning the lighting body accordingly, a high number of mechanical feelers, for example up to several dozen, positioned according to the type of lighting body, lens and car body to which the lighting body must be coupled, and a plurality of actuators, for example pneumatic actuators, for bringing the feelers into contact with the lighting body to acquire spatial measurements at various predetermined points, in particular along the outer border of the lens.

The above apparatus has many disadvantages. First, the arrangement of the feelers differs for each type of lighting body to be checked. Therefore, for each new type of lighting body, it is necessary to have new equipment with feelers and sensors positioned according to the specifications of the new lighting body, and to accurately adjust the pneumatic actuators so as not to damage and/or deform the lighting body while the spatial measurements are being acquired, the lighting body being made mainly of plastic. This operation takes a lot of time and is critical. Added to this is the need, in automatic systems, to provide a new automation for controlling the new equipment.

Second, the securing means, which must hold the lighting body on the support with appropriate force, and the feelers, which touch the surface of the lens while the spatial measurements are being obtained, tend to deform the lens and/or damage the external surface of the lens.

Third, if there is a need, for whatever reason, to increase the number of inspection points or change the position thereof, it is necessary to modify the equipment, this modification being costly and taking a considerable amount of time.

DISCLOSURE OF THE INVENTION

It is an aim of the present invention to provide an apparatus and an associated method for checking a complex-shaped body, for example a lighting body of a motor vehicle, and in particular the outer lens (or cover) thereof, this apparatus not having the above disadvantages, while being easy and inexpensive to produce.

As stated above, similar considerations may be applied in general to the checking of complex-shaped objects or components that need to be mounted with precise coupling on other elements.

The present invention provides an apparatus and an associated method for checking the dimensions and/or shape of a complex-shaped body, for example the outer lens of a lighting body for a motor vehicle, as defined in the attached claims.

BRIEF DESCRIPTION OF THE DRAWINGS

The present invention will now be described with reference to the attached drawings, which show a non-limiting embodiment thereof, in which.

BEST MODE FOR CARRYING OUT THE INVENTION

Figure 1:
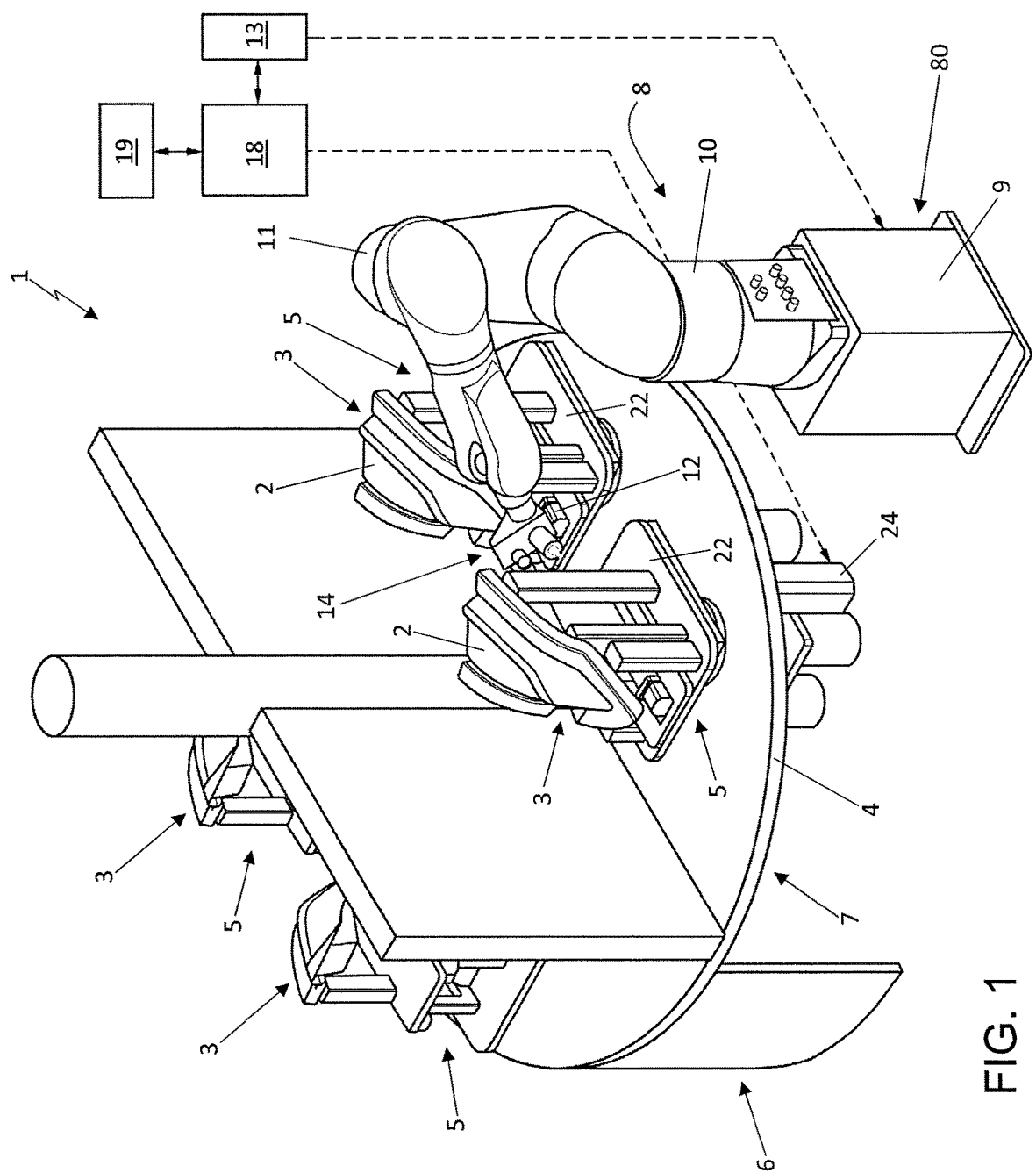
FIG. 1 shows a perspective view of the apparatus of the present invention for checking the dimensions and/or shape of a complex-shaped body, in particular an outer lens of a lighting body for a motor vehicle.

FIG. 1 shows, generally indicated as a whole by the reference sign 1, the checking or verification apparatus of the present invention for checking the dimensions and/or shape of a complex-shaped body, in particular an outer lens 2 of a lighting body 3 for a motor vehicle (the latter not being shown).

The checking apparatus 1 comprises a base 4, a plurality of checking supports 5, which are mounted on the base 4, each of which is capable of receiving a lighting body 3 in such a way that the respective lens 2, which in this case corresponds to the portion of the body to be measured, is completely visible. The base 4 is preferably rotary, but may also be a base with linear movement, for moving the checking supports 5 between a loading station 6 of the apparatus 1, where the lighting bodies 3 are each placed on a relative checking support 5, and a checking station 7 of the apparatus 1, where the lighting bodies 2 are checked.

The checking apparatus 1 comprises a robotic system 8, for example an anthropomorphic robotic system with six degrees of freedom, comprising: a robotic arm 80, which is arranged in the checking station 7 and comprises a fixed base 9, a shoulder 10, an elbow 11 and a movable bearing or wrist 12 connected kinematically to one another in a known manner; and an associated electronic control unit 13 for controlling the movements of the robotic arm 80, namely the shoulder 10, the elbow 11 and the wrist 12. The checking apparatus 1 further comprises an optical inspection assembly 14 mounted on the wrist 12.

Figure 2:
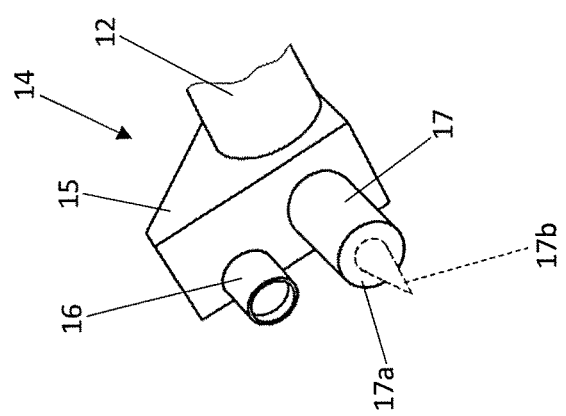
FIG. 2 shows an enlarged view of an optical inspection assembly of the apparatus of FIG. 1.

With reference to FIG. 2, the optical inspection assembly 14 is mounted on the wrist 12 by means of a stanchion 15 and comprises at least one contactless distance sensor, preferably of optical type. In the embodiment shown in FIG. 1, the optical inspection assembly 14 comprises a chromatic confocal distance sensor 17 and a digital camera 16. Both are mounted on the stanchion 15 in such a way that their optical axes are parallel to each other.

The digital camera 16 may have, instead of a conventional lens, a telecentric lens, use of which can guarantee low distortion, eliminate perspective errors and increase the resolution of the image.

In the case, as shown, in which there are transparent portions in the body to be measured, for example the outer lens of the lighting body, the distance sensor may advantageously be a chromatic confocal distance sensor, which overcomes the limits of other optical distance measuring devices, for example laser, being free of phenomena linked to refractive disturbances and multiple reflections.

The distance sensor 17 provides a measurement of the distance between its own reference, which is in this case identified for simplicity with the free axial end 17a, and a point on the surface of the body which is facing the free axial end 17a along the optical axis of said distance sensor 17. The distance sensor 17 identifies, on the surface of the body, a substantially point-like area, or focal point, schematically shown in FIG. 2 by the reference sign 17b, in front of the free axial end 17a, having a diameter of a few dozen μm, hence dimensions much smaller than the diameter of the contact end of any mechanical feeler. The use of a contactless sensor thus makes it possible to reach recesses and small areas on the body to be measured which cannot otherwise be reached by contact sensors.

The digital camera 16 acquires images of an outer border of the lens, which when processed accordingly provide information on the position of said outer border.

With reference again to FIG. 1, the checking apparatus 1 comprises a processing and control unit 18 having a respective digital memory 19, the latter being capable of storing reference data relating to a reference shape, or a shape having the nominal dimensions, of the lens 2.

The processing and control unit 18 is configured to control the robotic arm 80, through the respective control unit 13, so as to move the optical inspection assembly 14 over the lens 2.

Figure 3:
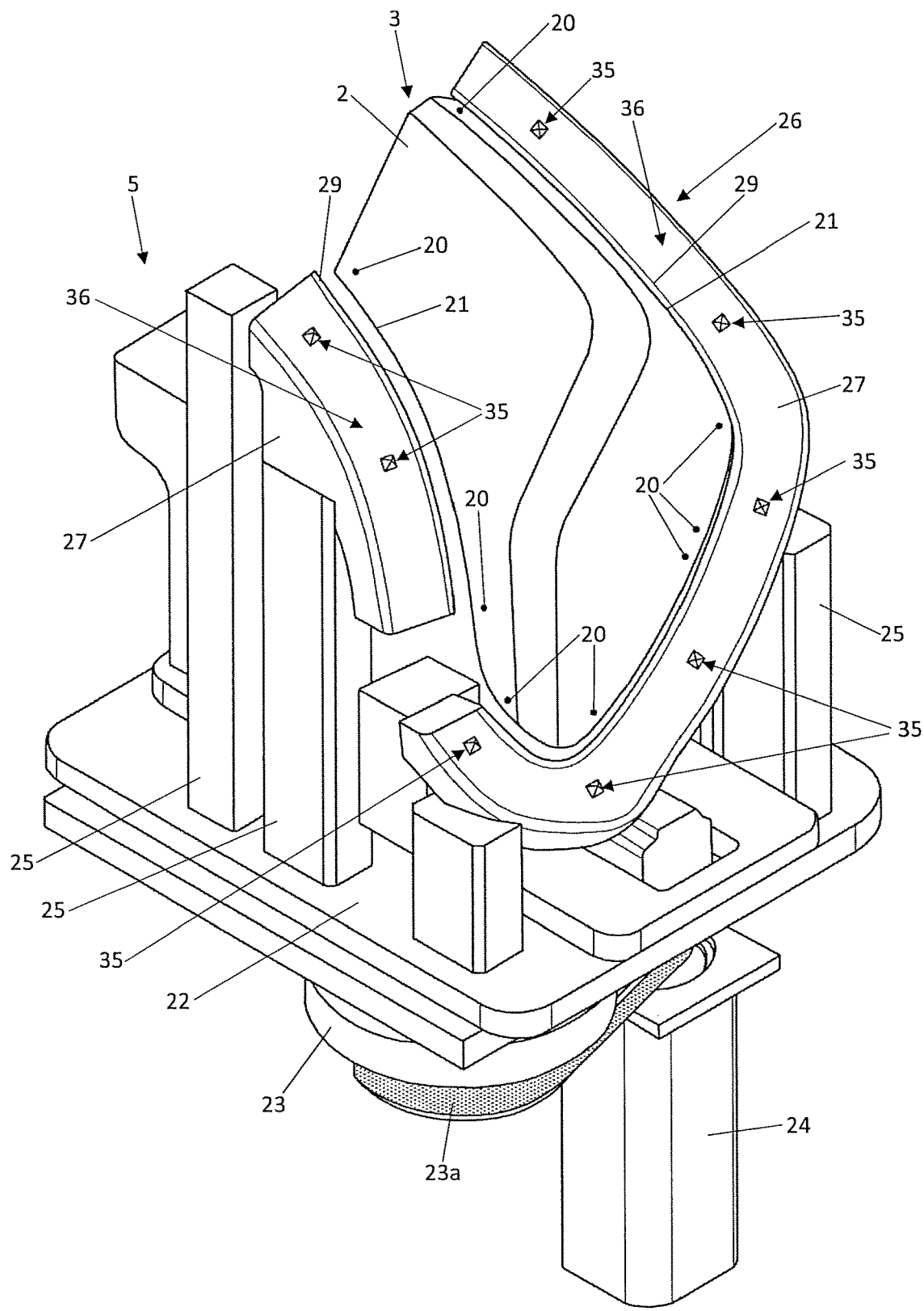
FIG. 3 shows, in a different perspective view and in more detail, a checking support of FIG. 1, with a lighting body to be checked placed on this checking support.

With reference to FIGS. 1 and 3, the processing and control unit 18 is configured to obtain, by means of the optical assembly 14, dimensional values in a spatial reference system at predetermined measuring points 20 on the lens 2.

The above mentioned spatial reference system is, for example, a Cartesian reference system which is fixed with respect to the base 9 of the robotic arm 80 and with respect to which the control unit 13 controls the movements of the robotic arm 80. More particularly, in the preferred embodiment shown in the figures, the processing and control unit 18 is configured to measure distances from the predetermined measuring points 20 on the lens 2 by means of the distance sensor 17 and acquire images of the outer border 21 of the lens 2 by means of the camera 16 as the robotic arm 80 moves the optical inspection assembly 14 around the lens 2.

Moreover, the processing and control unit 18 is configured to process the images so as to identify the position of the outer border 21 relative to the spatial reference system and to compare the dimensional values obtained, i.e. the distances measured and the identified position of the outer border 21, with the reference data stored in the digital memory 19. The purpose of the above comparison is to check whether the dimensions of the lens 2 measured fall within predetermined tolerances with respect to the reference shape of the lens 2.

The coordinates of the measuring points 20 relative to the spatial reference system are predetermined according to said reference shape and are stored in the digital memory 19.

The processing and control unit 18 and the control unit 13 are physically housed in the same cabinet, known per se and not shown.

According to another embodiment (not shown) of the present invention, the control unit 13 is integrated in the processing and control unit 18.

With reference to FIGS. 1 and 3, each checking support 5 is advantageously mounted on the base 4 by means of a respective rotating plate 22 moved by a respective mandrel 23 (FIG. 3) coupled kinematically to a respective electric motor 24, for example by means of a belt transmission 23a. The processing and control unit 18 is configured to control the motor 24, and thus the rotation of the rotating plate 22, in a synchronous manner with the movement of the optical inspection assembly 14 performed by the robotic arm 80.

The rotating plate 22 is used for positioning the outer lens 2, as far as possible, facing the robotic arm 80 in such a way that the latter does not have to move too extensively during the movement of the optical inspection assembly 14. Thus, the robotic arm 80 may have relatively small dimensions while the measurable volume is the same. Moreover, the rotating plate 22 makes it possible to measure any undercut portions of the lens 2 which, without the rotation of the plate, would not be accessible.

Each checking support 5 may comprise a plurality of uprights 25 and a frame 26, which is supported by the uprights 25 and, in use, at least partially surrounds the lens 2 when the relative lighting body 3 is placed on the checking support 5. The frame 26 is shaped in such a way as to follow at least partially the outer border of the reference shape of the lens 2 and hence, in use, to at least partially surround the outer border 21 of the lens 2 to be checked. In particular, the frame 26 comprises a plurality of portions 27, not necessarily contiguous as in the example shown, which are homothetic to corresponding segments of the reference shape of the lens 2. The space existing, in use, between the frame 26 and the outer border 21 of the lens 2 defines a separation strip.

Figure 4:
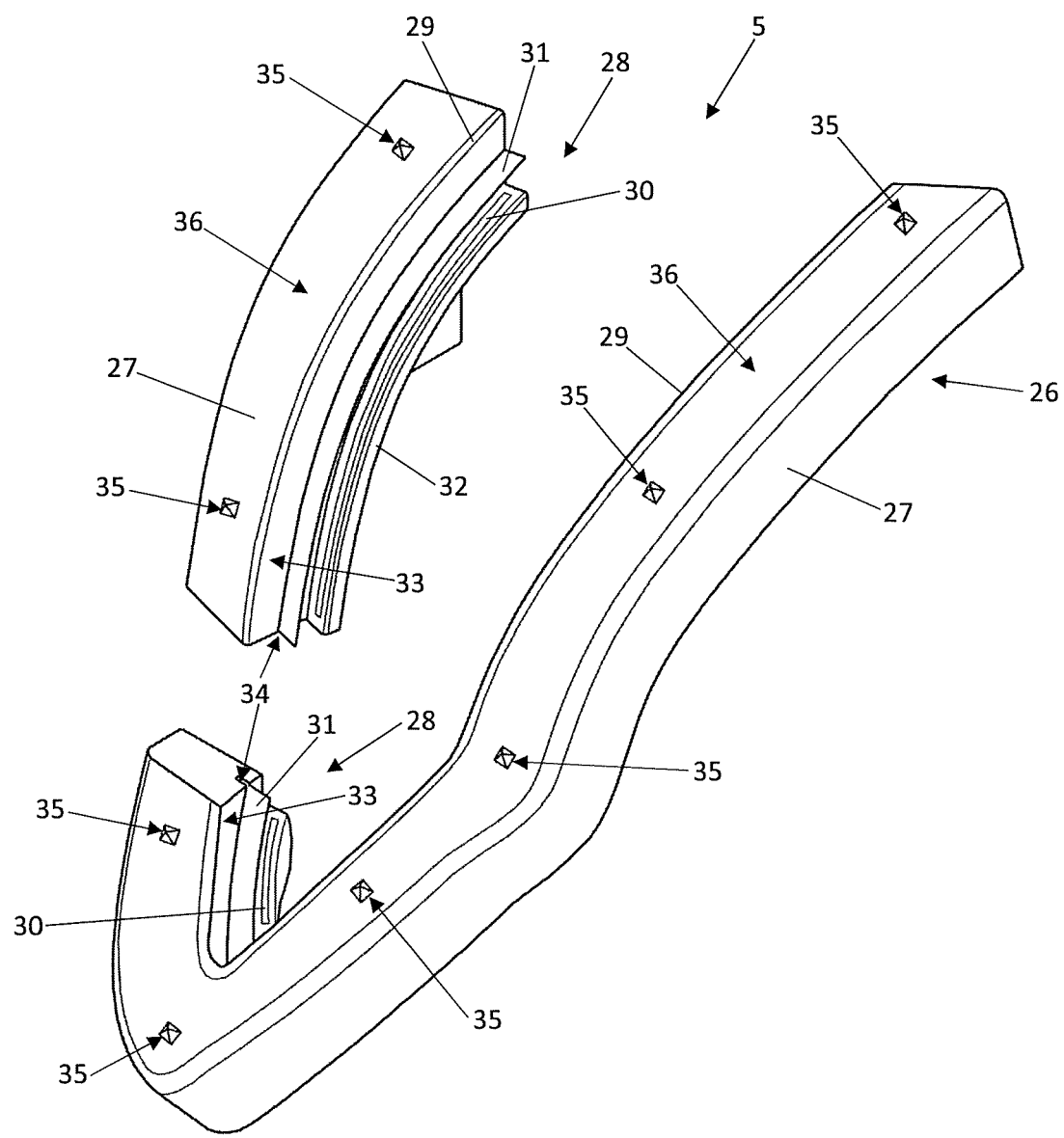
FIG. 4 shows a checking support of FIG. 1 with parts removed to reveal an associated backlight device.

FIG. 4 shows the checking support 5 of FIG. 3 from a different perspective and with some parts removed for greater clarity. With reference to this figure, each checking support 5 comprises a backlight device consisting of a light guide 28 for lighting from behind, or backlighting, the outer border 21 so as to increase the contrast of the images acquired by the camera 16 to highlight the line of the outer border 21 in the images.

The light guide 28 comprises portions shaped substantially like the portions 27 of the frame 26. The light guide 28 is mounted under an internal upper edge 29 of the frame 26 in such a way that, when used, the outer border 21 of the lens 2 is highlighted by a light band, not necessarily continuous, generated by the light guide 28 and placed, at the separation strip, at least between the portions 27 of the frame 26 and corresponding segments of the outer border 21.

In more detail, the light guide 28 comprises a plurality of LED strips 30, one for each portion 27 of the frame 26, and a respective plurality of diffuser elements 31, for example sheets or flaps of optically diffusive material such as opaline, of oblong shape, each of which covers a respective LED strip 30. A shoulder 32, not necessarily continuous as shown in the example, projects from an inside face 33 of the frame 26 and extends along the frame 26. A slot 34, also not necessarily continuous, is made in the inside face 33 and extends along the frame 26. The LED strips 30 are mounted on the shoulder 32 and the diffuser elements 31 are mounted accordingly on the checking support, for example at the slot 34, so as to overlay the LED strip at a suitable distance. The shoulder 32 and the slot 34 may define support means for the light guide 28.

According to another embodiment (not shown) of the present invention, at the shoulder 32 and the slot 34, the checking support comprises holder means consisting of C-shaped elements secured to the inside face 33 to hold the light guide 28.

With reference to FIGS. 3 and 4, each checking support 5 further comprises a plurality of reference elements 35 with predetermined dimensions and shape, defined in respective predetermined positions on the checking support 5. More particularly, these reference elements 35 are distributed regularly along the outer border of the outer lens. In the embodiment shown in the figures, the reference elements 35 are distributed along an external upper surface 36 of the frame 26, such that they can be detected, during a calibration phase of the robotic system, by the distance sensor 17 while this is moved by the robotic arm 80, this calibration phase making it possible to compensate for positioning errors of the robotic system 8.

The coordinates of the positioning points of the reference elements 35 with respect to the spatial reference system are stored in the digital memory 19.

The detecting of the position of the reference elements 35, if repeated periodically, also makes it possible to keep the stability of the system under control, through comparison with the stored data.

The reference elements 35 for example have the shape of a polyhedron, preferably pyramidal as in the example shown in FIG. 3. According to another embodiment (not shown) of the present invention, the reference elements have a prismatic shape.

The invention described above refers to the apparatus shown in the figures which comprises a confocal distance sensor and a digital camera for measuring distances from predetermined points on the surface of the lens and for acquiring images of the outer border of the lens, respectively.

According to an alternative embodiment, the optical assembly comprises a single distance sensor (for example a confocal or laser sensor) which, at various instants, measures distances with respect to the whole of the surface of the body, including the outer border. The measurements taken are then processed in a known manner to obtain information on the dimensions and/or shape of the body.

The position of the outer border of the body can in fact be determined, rather than by means of a digital camera, by means of the distance sensor (for example a confocal or laser sensor) which, by an appropriate scan movement, acquires a series of distance measurements along a direction transverse to the extent of the border of the body and identifies, at the minimum distance value detected, the position of the outer border of the body with respect to the spatial reference system.

The optical assembly may also comprise two different distance sensors (for example confocal or laser sensors) which measure distances at the outer border and at the rest of the surface of the body, respectively.

Alternatively, the optical assembly may comprise even just one digital camera which acquires images of the outer border of the body. In this case, the apparatus also comprises a distance sensor (for example a confocal or laser sensor) for detecting the position of the reference elements 35 or areas of the frame 26 during the calibration phase of the robotic system.

The reference elements 35 may be defined in the checking support 5 (as in the embodiment described and illustrated above) and may comprise, for example, other elements having known characteristics connected to the checking support 5, or may be defined by the frame 26 itself or by portions of the frame 26.

The stored reference data and the obtained dimensional values may comprise distance measurements and/or position data relating to the outer border of the body to be checked, depending on the components (distance sensor(s) and/or digital camera) of the optical assembly.

The apparatus described above has a checking support especially made for the body to be checked, comprising a plurality of uprights 25 and a frame 26. It is also possible to provide a simpler checking support, without uprights and/or a frame, suitable for the type of body to be controlled. In this case, the reference elements 35 are arranged directly on the checking support, preferably as close as possible to the points at which the measurements are taken. They may be arranged, for example, along the outer border of the body or in other areas of the surface thereof.

According to a further aspect of the present invention, a method is provided for checking the dimensions and/or shape of a complex-shaped body, or of at least a portion thereof, by using a checking apparatus as the one described above. In this regard, the processing and control unit 18 is configured to implement functional steps described below, comprising moving the robotic arm 80 and obtaining dimensional values relating to the portion of the body to be checked, at predetermined measuring points, by means of the optical inspection assembly 14.

The method according to the invention is described, as in the case of the checking apparatus, with express reference to checking the dimensions and/or shape of an outer lens 2 of a lighting body 3 of a vehicle, without, however, being confined to this case.

The checking method comprises a calibration phase of the robotic system, a phase of collecting (or acquiring) reference data of the reference shape of the lens 2 and a subsequent, real phase of dimensional checking.

The phase of collecting the reference data involves collecting and storing in the memory unit 19 reference data relating to predetermined measuring points.

According to a preferred embodiment of the method according to the invention, in this collecting phase, first of all, a master body with a reference portion having the reference shape of the lens 2 is placed on the checking support 5. The master body may alternatively have several reference portions that reproduce the reference shape of the lens 2. The master body is placed in such a way that the reference portion is completely visible.

The robotic system 8, more particularly the robotic arm 80, is controlled so as to move the optical inspection assembly 14 with respect to the reference portion, following an initial acquisition program executed by the processing and control unit 18, which uses checking paths and predetermined measuring points, for example the measuring points 20 shown in FIG. 3. The checking paths, which are stored in the digital memory 19, may be determined in a known manner by means of a mathematical algorithm developed on the basis of project design of the body 3 to be checked and loaded into the processing and control unit 18. A correction on the basis of local compensation parameters obtained in a calibration phase of the robotic system 8, which will be explained in detail below, is applied to the checking paths determined as described above. In other words, the checking paths are determined taking account of the local compensation parameters calculated in the calibration phase of the robotic system.

Alternatively, the checking paths may be defined in a preliminary cycle in which the movement of the robotic arm 80 is controlled in "manual" mode by an operator who interacts with the processing and control unit 18 by means of man-machine interface means which are known per se and not shown.

The collecting phase further comprises obtaining, by means of the optical assembly 14, reference data relating to the reference portion at the measuring points 20.

More particularly, during the movement of the optical inspection assembly 14 along the checking path, the distance sensor 17 measures distances, or first distances, between its free axial end 17a and the measuring points 20 on the reference portion, and the camera 16 acquires images, or first images, of an outer border of the reference portion. In particular, the robotic arm 80 is controlled so as to position the distance sensor 17 with its optical axis substantially perpendicular to the surface of the reference portion at the various measuring points 20, while the first measurements are obtained.

The processing and control unit 18 processes the first images so as to determine first position data which identify the outer border of the reference portion with respect to the spatial reference system.

The first distances and the first position data constitute the reference data relating to the reference shape and are stored in the digital memory 19.

The dimensional checking phase comprises placing the lighting body 3 on the checking support 5 in such a way that the lens 2 is completely visible. The processing and control unit 18 controls the robotic arm 80 so as to move the optical inspection assembly 14 with respect to the lens 2 along the checking paths already stored in the digital memory 19.

The phase of dimensional checking further comprises obtaining, by means of the optical assembly 14, dimensional values relating to the lens 2 at the measuring points 20. More particularly, as the optical inspection assembly 14 moves along the checking paths, the distance sensor 17 measures distances, or second distances, between its free axial end 17a and the measuring points 20 on the surface of the lens 2, and the camera 16 acquires images, or second images, of the outer border 21 of the lens 2. The processing and control unit 18 already knows the checking paths and therefore can control the robotic arm 80 so as to position the distance sensor 17 with its optical axis perpendicular to the surface of the lens 2 at the measuring points 20.

The processing and control unit 18 processes the second images in order to determine second position data which identify the outer border 21 of the lens 2 with respect to the spatial reference system.

At this point, the processing and control unit 18 compares the obtained dimensional values with the stored reference data. More particularly, the processing and control unit 18 compares the second distances with the first distances and the second position data with the first position data in order, as described above, to check whether the measured dimensions of the lens 2 fall within predetermined tolerances with respect to the reference shape of the lens 2.

According to a particular embodiment of the present invention, the first position data comprise the width of the separation strip existing between the frame 26 and the outer border of the reference portion of the master body and the second position data comprise the width of the separation strip between the frame 26 and the outer border 21 of the lens 2. The fact that the position of the outer border 21 is identified as a function of the width of the separation strip makes it possible to eliminate any positioning errors of the robotic system 8. In fact, the positioning error of the robotic system, more particularly of the robotic arm 80, is eliminated since it applies to both edges that delimit the separation strip (internal upper edge 29 and outer border 21) visible in the images.

According to a further embodiment of the present invention, in which the checking support has no frame, the first position data comprise the absolute position of the outer border of the reference portion of the master body and the second position data comprise the absolute position of the outer border 21 of the lens 2.

The light band existing between the frame 26 and the outer border of the reference portion of the master body or the outer border 21 of the lens 2 increases the contrast of the images and therefore improves identification of the frame and/or the outer border of the body (lens or master) placed on the checking support.

As stated above, the lighting body 3 is simply placed on the relative checking support 5. In this way, the position of the lighting body 3 is not altered during the dimensional checking phase.

The body to be checked preferably has, on the checking support, the same position that it will have once coupled to another body, and this aspect guarantees better accuracy in measurement. In other words, according to a preferred embodiment, the checking support reproduces the position that the body to be checked has when mounted coupled to other objects. Advantageously, the checking support 5 comprises securing devices (not shown) for the body to be checked, at the points on this body at which the latter will be secured to the other body. In the case of the lighting body 3, the securing devices present on the checking support are positioned at the points at which the lighting body will be mounted and secured to the vehicle.

The phases of collecting the reference data and of dimensional checking are described above with reference to the embodiment shown in the figures which provides for the presence of a distance sensor and a camera. However, it is possible to implement the method according to the invention also in alternative embodiments which provide for the presence of a single distance sensor or a pair of distance sensors to perform measurements of the surface of the body to be checked and/or to determine the position of the outer border. The method according to the invention applies also to the case in which the optical assembly comprises only one digital camera to determine the position of the outer border of the body.

The reference data relating to the predetermined measuring points which are acquired during the collecting phase comprise distance measurements and/or position data depending on the components (distance sensor(s) and/or digital camera) of the optical assembly.

The checking method according to the invention comprises a phase of calibrating the robotic system 8 which precedes the phase of collecting the reference data.

It is known for the robotic system to undergo standard calibration for "hooking up" the spatial reference system of the robotic system 8 to the spatial reference system referred to the body 3 to be checked and correct positioning errors of the robotic system 8. However, owing to mechanical inaccuracies of the robotic system, there is still a residual positioning error, which is generally not constant with respect to the system working volume but which typically increases non-linearly as the distance between the point of origin of the reference system and the point on the body which has to be checked increases. To render the robotic system suitable for use for checking dimensions and/or shape which requiring extremely high accuracy, it is necessary to eliminate or at least considerably reduce the residual positioning error in the robotic system. Some robotic system manufacturers provide additional compensation functions for the robotic system which involve inserting in the software of the system a correction table to be applied to each point of the spatial reference system. However, the correction thus made does not provide sufficient guarantee of stability as it is affected by various aspects external to the system, such as wear of the robotic system or of the components associated therewith, changes in temperature, the shape of the tool mounted on the robotic system, the speed and/or acceleration to which the system is subjected, or shocks to which it may be subjected, no matter how small.

The calibration phase included in the method according to the invention overcomes the abovementioned disadvantages and guarantees precise positioning of the robotic system 8 within the whole working volume, so that it can be used for controlling dimensions and/or shape.

As stated above, the calibration phase of the method according to the invention involves defining the reference elements 35 on the checking support 5, for example on the frame 26, said reference elements 35 being measured, for example, by means of a coordinate-measuring machine, and having known characteristics, such as orientation, dimensions and shape. These elements are arranged at predetermined points on the checking support 5, preferably close to the measuring points, and preferably have a polyhedral shape.

The robotic arm 80 is controlled so as to move the distance sensor along predetermined calibration paths which differ from the dimensional checking paths and, during this movement, to acquire actual positions of the reference elements 35 with respect to the spatial reference system by means of the distance sensor 17.

The calibration paths may be determined in a known manner by means of a mathematical algorithm developed on the basis of the project design of the checking support 5 and loaded into the processing and control unit 18. In this case, acquisition of the actual positions of the reference elements 35 by the robotic system 8 is automatic.

Alternatively, this acquisition may be manual: the movement of the robotic arm 80 along the calibration paths is controlled in manual mode by an operator who interacts with the processing and control unit 18 using man-machine interface means.

More particularly, the robotic arm 80 is brought close to the reference elements 35 and for each of them measures positions and orientation of the various faces of said element. By measuring the faces, the robotic system 8 obtains, by processing, information relating to the location of the planes in which the faces lie (positions and angles). If, for example, the reference element is pyramidal, it is possible to calculate, from the point of intersection of the four planes in which the faces of the pyramid lie, the position of the apex of the element.

The processing and control unit 18 calculates, for each reference element 35, local compensation parameters as a function of the predetermined positions and actual positions of the reference elements 35 to correct positioning errors of the robotic system 8 with respect to the spatial reference system.

In other words, by comparing the values detected by the robotic system 8 and the known characteristics of the reference elements 35, it is possible to obtain the data for calculating local compensation parameters and make subsequent fine corrections to the spatial reference system of the robotic system 8, in areas close to each reference element 35, which reduce or eliminate the residual positioning error. The local compensation parameters calculated are preferably stored in a memory of the control unit 13.

The correction is preferably applied in real time, i.e. it is not performed a posteriori but is used to position the robotic system 8 in the intended position with minimal error.

In this way, by arranging various reference elements 35 in suitable positions in the working volume, and more particularly close to the areas of the body 3 where the dimensional check will be performed, i.e. close to the measuring points, the robotic system 8 can apply various fine corrections relating to the position that the optical assembly 14 takes in the space each time by applying corrections associated with the reference element 35 closest to the working position at that particular instant. In other words, the positioning of the robotic system 8 is corrected by applying the local compensation parameters associated with the reference element 35 closest to the position that the optical assembly 14 takes each time.

Each local compensation parameter is in fact used locally, i.e. used for converting coordinates into a volume of space centred on a respective reference element 35.

The local compensation parameters may also be stored in the digital memory 19 and used during the subsequent phases of collecting the reference data and checking the dimensions of the portion to be checked, for example the lens of the lighting body. In particular, the first and second distances from the measuring points 20 are measured and/or the first and second position data are determined during the reference data acquisition and dimensional checking phases, taking into account these local compensation parameters.

The calibration phase may be repeated periodically to check that the paths followed by the robotic arm 80 are stable over time. By carrying out further calibration phases it is possible to check the variability of the local compensation parameters over time.

Although the invention described above makes particular reference to a very specific embodiment, it should not be deemed to be confined to this embodiment but encompasses all variants, modifications or simplifications covered by the attached claims.

For example, in an alternative solution the backlight device is not present. In this case, the checking support 5 preferably has parts of light colour to increase the contrast and improve identification, by the camera, of the frame and/or of the outer border of the body to be checked or of the master body placed on the checking support 5.

It is also possible to have an optical assembly that comprises a plurality of distance sensors, for example optical probes.

The main advantage of the checking apparatus 1 and the related checking method described above is the improved flexibility, i.e. the greater simplicity of reconfiguration of the apparatus when the type of body 3 to be checked changes. Indeed, in this case it is not necessary to proceed with complicated resetting of dozens of mechanical feelers each time the type of body 3 to be checked changes.

Another important advantage is the possibility of taking measurements without touching the surface 2 of the body. In fact, the function of the feelers is replaced by the optical inspection assembly 14 moved by the robotic arm 80.

The invention claimed is:

1. An apparatus for the contactless checking of dimensions and/or shape of a complex-shaped body, comprising:
    a checking support, which is adapted to support the body to be checked;
    a robotic system including a movable bearing;
    an optical assembly mounted on the movable bearing;
    a memory unit to store reference data related to a reference shape of the body to be checked;
    a processing and control unit configured to control said robotic system so as to move said optical assembly with respect to the body to be checked, obtain by means of the optical assembly dimensional values at predetermined measuring points, and compare said dimensional values to said reference data;
    reference elements which have known characteristics and are defined in the checking support at predetermined positions; and
    a distance sensor to acquire actual positions of said reference elements with respect to a spatial reference system;
    the processing and control unit being adapted to calculate, for each of the reference elements local compensation parameters as a function of said predetermined positions and actual positions of the reference elements to correct positioning errors of said robotic system with respect to said spatial reference system.

2. The apparatus according to claim 1, wherein the reference elements are placed close to the measuring points.

3. The apparatus according to claim 1, wherein the optical assembly comprises the distance sensor.

4. The apparatus according to claim 3, wherein the distance sensor measures distances of said measuring points on the body to be checked during the movement of the optical assembly, the processing and control unit comparing said distances to said reference data.

5. The apparatus according to claim 4, wherein the distance sensor measures distances with respect to an outer border of the body to be checked by performing a scan movement along a direction transverse to the extent of the outer border of the body to be checked at the measuring points during the movement of the optical assembly, the processing and control unit processing said measured distances to identify the position of the outer border with respect to the spatial reference system and comparing the identified position to said reference data.

6. The apparatus according to claim 1, wherein the optical assembly comprises a camera which acquires images of an outer border of the body to be checked during the movement of the optical assembly, the processing and control unit processing said images to identify the position of the outer border with respect to the spatial reference system and comparing the identified position to said reference data.

7. The apparatus according to claim 6, wherein said optical assembly comprises a stanchion mounted on the movable bearing and said distance sensor and camera are fixed to the stanchion in such a way that their optical axes are parallel to each other.

8. The apparatus according to claim 6, wherein said checking support comprises a backlight device placed in such a way as to backlight said outer border of the body to be checked to increase the contrast of said images of the outer border.

9. The apparatus according to claim 1, wherein said checking support comprises a frame, which has at least one frame portion that is substantially homothetic to a corresponding segment of a border of said reference shape.

10. The apparatus according to claim 9, wherein said checking support comprises a backlight device mounted under an internal upper edge of said frame in such a way that, when used, the outer border of the body to be checked is highlighted by a light band generated by said backlight device and placed at least between said frame portion and a corresponding segment of said outer border.

11. The apparatus according to claim 9, wherein the reference elements are defined by the frame.

12. The apparatus according to claim 1, wherein the reference elements have a polyhedral shape.

13. The apparatus according to claim 1 and including at least one motorized rotating plate on which said checking support is mounted; said processing and control unit being configured to control the rotation of said motorized plate in a synchronous manner with the movement of the optical assembly.

14. A method for the contactless checking of dimensions and/or shape of a complex-shaped body by means of a checking apparatus including a checking support adapted to support the body to be checked, a robotic system, an optical assembly mounted on the robotic system, a memory unit, a processing and control unit and a distance sensor, the method comprising:
    a calibration phase of the robotic system comprising:
        defining on the checking support at predetermined positions a plurality of reference elements with known characteristics;
        controlling said robotic system to move the distance sensor along predetermined calibration paths;
        collecting by means of said distance sensor actual positions of said reference elements with respect to a spatial reference system; and
        calculating for each of the reference elements local compensation parameters as a function of the predetermined positions and the actual positions of said reference elements to correct positioning errors of said robotic system with respect to said spatial reference system;
    a reference data collecting phase comprising:
        collecting and memorizing in said memory unit reference data related to predetermined measuring points; and
    a dimensional checking phase of said body to be checked comprising:
        placing said body on said checking support;
        controlling said robotic system to move the optical assembly with respect to said body to be checked along checking paths;
        obtaining dimensional values of said body to be checked at said measuring points by means of the optical assembly; and comparing said dimensional values to the reference data;

said reference data collecting phase and dimensional checking phase of the body to be checked taking into consideration said local compensation parameters.

15. The method according to claim 14, wherein said reference elements are placed close to the measuring points.

16. The method according to claim 14, wherein the positioning of the robotic system is corrected by applying the local compensation parameters associated to the nearest reference element to the position that the optical assembly takes each time.

17. The method according to claim 14, wherein the optical assembly includes a distance sensor, said distance sensor measuring distances of said predetermined measuring points on said body to be checked, and the obtained dimensional values comprise said distances.

18. The method according to claim 14, wherein the optical assembly includes a camera acquiring images of an outer border of the body to be checked, said images being processed to determine position data that identify the outer border of the body to be checked with respect to said spatial reference system, and the obtained dimensional values comprising said position data.

19. The method according to claim 14, wherein the reference data collecting phase comprises:
placing on said checking support a master body that has a reference portion with a reference shape;
controlling said robotic system to move the optical assembly with respect to said reference portion along the predetermined checking paths;
obtaining said reference data at the predetermined measuring points on said reference portion by means of said optical assembly.

20. The method according to claim 19, wherein the reference data acquired during the collecting phase comprise measured distances of said measuring points on said reference portion of the master body by means of said distance sensor.

21. Method according to claim 18, wherein the reference data collecting phase comprises: placing on said checking support a master body that has a reference portion with a reference shape; controlling said robotic system to move the optical assembly with respect to said reference portion along the predetermined checking paths; and obtaining said reference data at the predetermined measuring points on said reference portion by means of said camera, the reference data comprising position data which are obtained by processing images of an outer border of said reference portion.

22. The method according to claim 21, wherein the checking support includes a frame, which has at least one frame portion which is substantially homothetic to a corresponding segment of a border of said reference portion, said position data related to the outer border of the reference portion include the width of a separation strip between said frame and said outer border of said reference portion of the master body and said position data related to the outer border of the body to be checked include the width of a separation strip between said frame and said outer border of the body to be checked.

23. The method according to claim 22, wherein the checking support includes a backlight device mounted under an internal upper edge of said frame in such a way that the outer border of the body to be checked is highlighted by a light band generated by said backlight device and placed at least between said frame portion and a corresponding segment of said outer border.

24. The method according to claim 14, wherein the reference elements have a polyhedral shape.

25. The method according to claim 22, wherein the reference elements are defined by the frame.

26. The method according to claim 14, wherein the checking paths are determined by taking into consideration the local compensation parameters which are calculated in the calibration phase of the robotic system.

* * * * *